United States Patent
Sato

(10) Patent No.: US 10,025,541 B2
(45) Date of Patent: Jul. 17, 2018

(54) IMAGE PROCESSING APPARATUS, AND COMPUTER READABLE MEDIUM FOR COMMUNICATING WITH THE SAME

(71) Applicant: BROTHER KOGYO KABUSHIKI KAISHA, Nagoya-shi, Aichi-ken (JP)

(72) Inventor: Hirokazu Sato, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/603,582

(22) Filed: Jan. 23, 2015

(65) Prior Publication Data

US 2015/0138600 A1 May 21, 2015

Related U.S. Application Data

(63) Continuation of application No. 13/829,963, filed on Mar. 14, 2013, now Pat. No. 8,941,850.

(30) Foreign Application Priority Data

Mar. 30, 2012 (JP) ................................ 2012-082822

(51) Int. Cl.
  *G06F 3/12* (2006.01)
  *H04N 1/00* (2006.01)
  *G06K 15/00* (2006.01)

(52) U.S. Cl.
  CPC .......... *G06F 3/1236* (2013.01); *G06F 3/1206* (2013.01); *G06F 3/1292* (2013.01);
  (Continued)

(58) Field of Classification Search
  CPC .... G06F 3/1205; G06F 3/1206; G06F 3/1236; G06F 3/1259; G06F 3/1271; G06F 3/1292; G06F 3/1293; H04N 1/00106; H04N 1/00204; H04N 1/00307; H04N 2201/0015; H04N 2201/0044; H04N 2201/0055; H04N 2201/006; H04N 2201/0094
  (Continued)

(56) References Cited

U.S. PATENT DOCUMENTS 7,328,245 B1 2/2008 Hull et al.
8,245,149 B2 8/2012 Ito
(Continued)

FOREIGN PATENT DOCUMENTS

JP 2002-244831 A 8/2002
JP 2002278715 A * 9/2002 ......... H04N 1/00127
(Continued)

*Primary Examiner* — Chad Dickerson
(74) *Attorney, Agent, or Firm* — Merchant & Gould P.C.

(57) ABSTRACT

An image processing apparatus is provided that includes a first communication device, a second communication device, an informing device, and a controller configured to control the first communication device to establish first communication with an information processing terminal device that is within a predetermined communicable distance from the first communication device, and to control the second communication device to transmit, to the information processing terminal device, target data that has been informed of by the informing device at a time when the first communication is established between the first communication device and the information processing terminal device.

15 Claims, 6 Drawing Sheets

(52) U.S. Cl.
CPC ..... *H04N 1/00106* (2013.01); *H04N 1/00204* (2013.01); *H04N 1/00307* (2013.01); *H04N 2201/006* (2013.01); *H04N 2201/0015* (2013.01); *H04N 2201/0044* (2013.01); *H04N 2201/0055* (2013.01); *H04N 2201/0094* (2013.01)

(58) Field of Classification Search
USPC ........ 370/328, 329, 254–258; 455/450, 41.1, 455/41.2, 41.3, 66.1; 358/1.11–1.18, 358/400–404; 709/201–203, 211–217, 709/227–229
See application file for complete search history.

(56) References Cited

U.S. PATENT DOCUMENTS

| | | |
|---|---|---|
| 2001/0029521 A1 | 10/2001 | Matsuda et al. |
| 2002/0083092 A1 | 6/2002 | Simpson |
| 2004/0128349 A1* | 7/2004 | Maruyama ............. G06Q 30/02 709/203 |
| 2005/0036167 A1* | 2/2005 | Atsumi ............. H04N 1/32363 358/1.15 |
| 2005/0105140 A1* | 5/2005 | Ozaki ................ H04N 1/32144 358/402 |
| 2005/0157339 A1 | 7/2005 | Ahn et al. |
| 2005/0268241 A1 | 12/2005 | Lerner |
| 2006/0075474 A1 | 4/2006 | Takeuchi et al. |
| 2007/0152957 A1 | 7/2007 | Shibata |
| 2007/0192246 A1 | 8/2007 | Futamase |
| 2008/0074713 A1 | 3/2008 | Nakawaki |
| 2008/0130045 A1 | 6/2008 | Oguri et al. |
| 2009/0052348 A1* | 2/2009 | Kato .................. H04L 63/0492 370/254 |
| 2009/0066998 A1* | 3/2009 | Kato ...................... G01C 21/26 358/1.15 |
| 2009/0103124 A1* | 4/2009 | Kimura ................. G06F 3/1204 358/1.15 |
| 2009/0215398 A1 | 8/2009 | Adler et al. |
| 2010/0069008 A1* | 3/2010 | Oshima ................... H04W 4/02 455/41.3 |
| 2010/0167648 A1 | 7/2010 | Doutriaux |
| 2010/0195539 A1 | 8/2010 | Tian et al. |
| 2010/0279609 A1 | 11/2010 | Black et al. |
| 2012/0170559 A1 | 7/2012 | Feinberg et al. |
| 2012/0243029 A1* | 9/2012 | St. Jacques, Jr. ..... G06F 3/1204 358/1.15 |
| 2013/0229685 A1* | 9/2013 | Naruse .................. G06F 3/1207 358/1.15 |
| 2013/0229690 A1* | 9/2013 | Sumita ............... H04N 1/00127 358/1.15 |
| 2013/0237148 A1 | 9/2013 | McCann et al. |
| 2013/0258381 A1 | 10/2013 | Sato |

FOREIGN PATENT DOCUMENTS

| | | |
|---|---|---|
| JP | 2008-079151 A | 4/2008 |
| JP | 2010011420 A * | 1/2010 |

* cited by examiner

IMAGE PROCESSING APPARATUS, AND COMPUTER READABLE MEDIUM FOR COMMUNICATING WITH THE SAME

CROSS-REFERENCE TO RELATED APPLICATION

This application is a continuation of U.S. patent application Ser. No. 13/829,963, filed Mar. 14, 2013, and further claims priority under 35 U.S.C. § 119 from Japanese Patent Application No. 2012-082822 filed on Mar. 30, 2012. The subject matter of both application are incorporated herein by reference in their entirety.

BACKGROUND

Technical Field

The following description relates to one or more techniques to allow a user to select data through a simple procedure in an image processing system that includes an image processing apparatus and an information processing terminal device.

Related Art

A technique has been known that is configured to establish wireless communication (e.g., near field communication (NFC) and wireless LAN) between an information processing terminal device (e.g., a mobile phone and a notebook computer) and an image processing apparatus (e.g., a printer) and to perform data communication therebetween.

SUMMARY

The known technique is further configured to, in advance of accepting a selection of data to be communicated, display a list of identification information (e.g., file names) of data on a display device of the image processing apparatus and prompt a user to select the data to be communicated. Hence, the user may need to perform various operations when selecting the data to be communicated. Thus, the known technique requiring such operations is not necessarily user-friendly.

Aspects of the present invention are advantageous to provide one or more improved techniques for overcoming the aforementioned inconveniences of the known technique.

According to aspects of the present invention, an image processing apparatus is provided that includes a first communication device configured to communicate with an information processing terminal device via first communication within a first communicable distance between the first communication device and the information processing terminal device, a second communication device configured to communicate with the information processing terminal device via second communication within a second communicable distance, longer than the first communicable distance, between the second communication device and the information processing terminal device, an informing device configured to inform of target data, and a controller configured to control the first communication device to establish the first communication with the information processing terminal device that is within the first communicable distance from the first communication device, and control the second communication device to transmit, to the information processing terminal device, the target data that has been informed of by the informing device at a time when the first communication is established between the first communication device and the information processing terminal device.

According to aspects of the present invention, further provided is an image processing apparatus that includes a first image processing device configured to input first image data, a second image processing device configured to output second image data, a first communication device configured to communicate with an information processing terminal device via first communication, a second communication device configured to communicate with the information processing terminal device via second communication, and a controller configured to control the first communication device to establish the first communication with the information processing terminal device, and control the second communication device to transmit, to the information processing terminal device, one of the first image data that is being input by the first image processing device at a time when the first communication is established between the first communication device and the information processing terminal device and the second image data that is being output by the second image processing device at the time when the first communication is established between the first communication device and the information processing terminal device.

According to aspects of the present invention, further provided is a non-transitory computer readable medium storing computer readable instructions configured to, when executed on a computer, cause the computer to establish first communication with an image processing apparatus, establish second communication with the image processing apparatus, receive data identification information for identifying data from the image processing apparatus via the first communication, transmit a request containing the received data identification information to the image processing apparatus via the second communication, and receive the data identified by the data identification information from the image processing apparatus via the second communication.

BRIEF DESCRIPTION OF THE ACCOMPANYING DRAWINGS

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented on circuits (such as application specific integrated circuits) or in computer software as programs storable on computer readable media including but not limited to RAMs, ROMs, flash memories, EEPROMs, CD-media, DVD-media, temporary storage, hard disk drives, floppy drives, permanent storage, and the like.

Hereinafter, an embodiment according to aspects of the present invention will be described with reference to the accompanying drawings.

<Configuration of Communication System>

Figure 1:
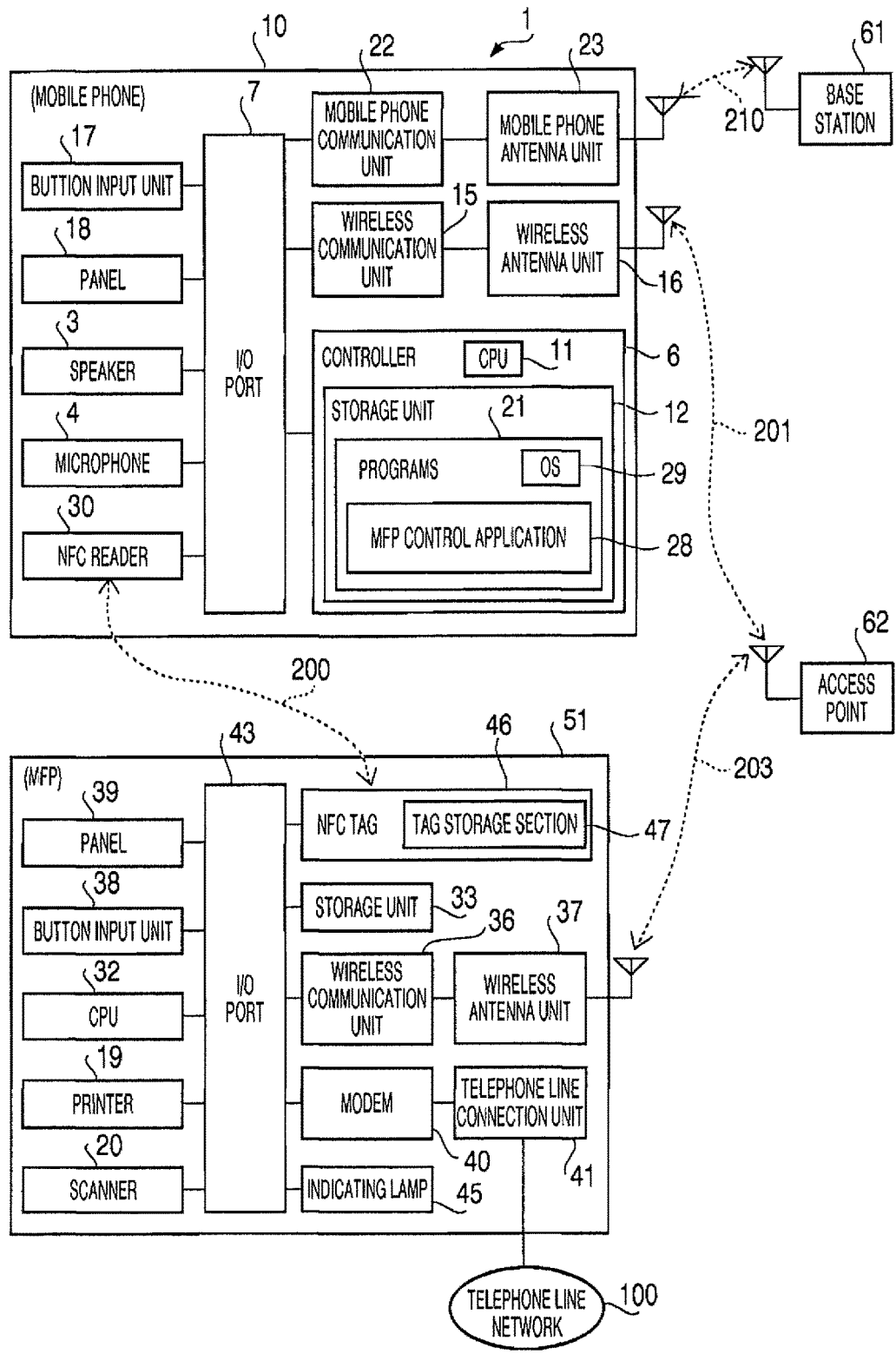
FIG. 1 is a block diagram of a communication system in an embodiment according to one or more aspects of the present invention.

As shown in FIG. 1, a communication system 1 of the embodiment includes a mobile phone 10, a multi-function peripheral (MFP) 51, an access point 62, and a base station 61. Each of the mobile phone 10 and the MFP 51 is configured to serve as a known wireless LAN terminal device. Further, the MFP 51 is configured to perform communication using a telephone line network 100. The access point 62 is configured to serve as a known wireless LAN access point.

The MFP 51 has a plurality of functions such as a facsimile transmission function, an incoming facsimile browsing function, a scanning function, and a printing function. The facsimile transmission function is a function to transmit image data to an external device (not shown) via the telephone line network 100. The incoming facsimile browsing function is a function to receive image data from an external device (not shown) via the telephone line network 100 and output the received image data (the outputting of the received image data may include at least one of displaying and printing the received image data). The scanning function is a function to scan a document sheet by means of a scanner 20 and produce image data. The printing function is a function to print image data on a printing sheet by means of a printer 19.

<Configuration of Mobile Phone>

As shown in FIG. 1, the mobile phone 10 includes a controller 6, a wireless communication unit 15, a wireless antenna unit 16, a button input unit 17, a panel 18, a mobile phone communication unit 22, a mobile phone antenna unit 23, and a near field communication (NFC) reader 30. Further, the mobile phone 10 includes a speaker 3 and a microphone 4 in order to perform voice communication and input a sound. The elements included in the mobile phone 10 are configured to communicate with each other via an input-output (I/O) port 7.

The controller 6 includes a central processing unit (CPU) 11 and a storage unit 12. The CPU 11 is configured to execute programs stored in the storage unit 12. The storage unit 12 may be configured with a combination of a random access memory (RAM), a read only memory (RAM), a flash memory, a hard disk drive (HDD), and a buffer memory of the CPU 11. The storage unit 12 is configured to store programs 21. The programs 21 include a MFP control application 28, and an operating system (OS) 29. The OS 29 includes a program for causing the mobile phone communication unit 22 to perform communication, and a program for causing the wireless communication unit 15 to perform wireless LAN communication 201. Further, the OS 29 includes a program that serves an application programming interface (API) for allowing each individual program to obtain information acquired by various kinds of hardware such as the NFC reader 30 or for allowing each individual program to provide instructions to the various kinds of hardware. Further, the MFP control application 28 is a program for causing the CPU 11 to execute a below-mentioned communication process to communicate with the MFP 51.

The wireless communication unit 15 is configured to perform, via the wireless antenna unit 16, the wireless LAN communication 201 complying with an infrastructure mode (a mode to allow a plurality of wireless LAN communication terminal devices to perform data communication via an access point) of a wireless LAN method (a data communication method via radio waves). Thus, digital signals that form various kinds of data are transmitted and received via the wireless communication unit 15. As an example of the wireless LAN method, cited is a communication method defined by the standard IEEE802.11a/b/g/n. The NFC reader 30 is configured to perform NFC communication 200 with an NFC tag 46. The NFC communication 200 is a near-field-type wireless communication executable within a communication area of an extremely short distance equal to or less than one meter. The NFC communication 200 may include infrared communication and Bluetooth (trademark registered). Establishment of the NFC communication 200 does not need various kinds of communication setting information (such as an IP address and an SSID). Further, the mobile phone communication unit 22 is configured to perform wireless communication 210 complying with a mobile phone communication method (a cellular phone communication method), with the base station 61 via the mobile phone antenna unit 23.

The button input unit 17 is configured to accept operations from a user of the mobile phone 10. The button input unit 17 may be configured as a touch panel integrated with the panel 18. The panel 18 is configured to display various kinds of information as to functions of the mobile phone 10.

<Configuration of MFP>

The MFP 51 includes the printer 19, the scanner 20 a CPU 32, a storage unit 33, a wireless communication unit 36, a wireless antenna unit 37, a button input unit 38, a panel 39, a modem 40, a telephone line connection unit 41, the NFC tag 46, and an indicating lamp 45. The elements included in the MFP 51 are configured to communicate with each other via an input-output (I/O) port 43.

The NFC tag 46 is configured to perform the NFC communication 200 with the NFC reader 30. The NFC tag 46 is provided with a tag storage section 47, which is a non-volatile memory configured to store data to be transmitted from the NFC tag 46 to the NFC reader 30. Specifically, the tag storage section 47 is configured to store selected-function information and communication setting information. The selected-function information indicates which function is selected from the functions of the MFP 51 (such as the facsimile transmission function, the incoming facsimile browsing function, the scanning function, and the printing function). It is noted that the selected function may not necessarily be selected by the user. The communication setting information includes various settings for allowing the mobile phone 10 to establish wireless LAN communication 203 with the wireless communication unit 36 of the MFP 51. For example, the communication setting information may contain access point information and an MFP-IP address. For example, the access point information may include an SSID of the access point 62. For example, the MFP-IP address may include an IP address of the MFP 51.

The CPU 32 is configured to execute programs stored in the storage unit 33. The storage unit 33 may be configured with a combination of a random access memory (RAM), a read only memory (RAM), a flash memory, and a hard disk drive (HDD). The storage unit 33 is configured to store image data and a data list. The image data is data acquired by various processes (such as a scanning process by the scanner 20 and a facsimile receiving process by the modem 40) and stored in the storage unit 33. The data list is a list of data identification information for identifying each individual image data stored in the storage unit 33. The data identification information may include file names of the image data. The data list is created in association with each individual function. For instance, the data list created in association with the printing function contains image data, printable by the printer 19, extracted from all the image data stored in the storage unit 33.

The wireless communication unit 36 is configured to transmit and receive digital signals that form various kinds of data, by performing the wireless LAN communication 203 with the access point 62 via the wireless antenna unit 37. The wireless LAN communication 203 is carried out at a higher communication speed than the communication speed of the NFC communication 200 within a longer communicable distance than the communicable distance of the NFC communication 200.

The button input unit 38 includes keys for executing the functions of the MFP 51. The button input unit 38 may be configured as a touch panel integrated with the panel 39. The panel 39 is configured to display various kinds of information as to the functions of the MFP 51. The printer 19 is configured to perform printing on a printing sheet. The scanner 20 is configured to scan a document sheet and produce image data. The modem 40 is configured to modulate document data, to be transmitted by means of the facsimile function, into signals transmittable via the telephone line network 100, and transmit the modulated signals via the telephone line connection unit 41. Further, the modem 40 is configured to receive signals from the telephone line network 100 via the telephone line connection unit 41 and demodulate the received signals into document data. The indicating lamp 45, which includes a light emitting diode (LED), is configured to provide the user with information on various statuses of the MFP 51.

The mobile phone 10 and the access point 62 are configured to perform the wireless LAN communication 201 complying with the infrastructure mode of the wireless LAN method. Further, the MFP 51 and the access point 62 are configured to perform the wireless LAN communication 203 complying with the infrastructure mode of the wireless LAN method. Therefore, when the mobile phone 10 and the MFP 51 access the access point 62 to achieve a state where the wireless LAN communications 201 and 203 complying with the infrastructure mode of the wireless LAN method are available, the mobile phone 10 and the MFP 51 are allowed to perform data communication therebetween.

Further, the mobile phone 10 and the MFP 51 are configured to perform the NFC communication 200. Therefore, by bringing the mobile phone 10 into close proximity to the MFP 51 (e.g., holding the mobile phone 10 over the MFP 51) to establish the NFC communication 200, it is possible to perform communication of various kinds of information between the mobile phone 10 and the MFP 51.

<Operations of Communication System>

Figure 2:
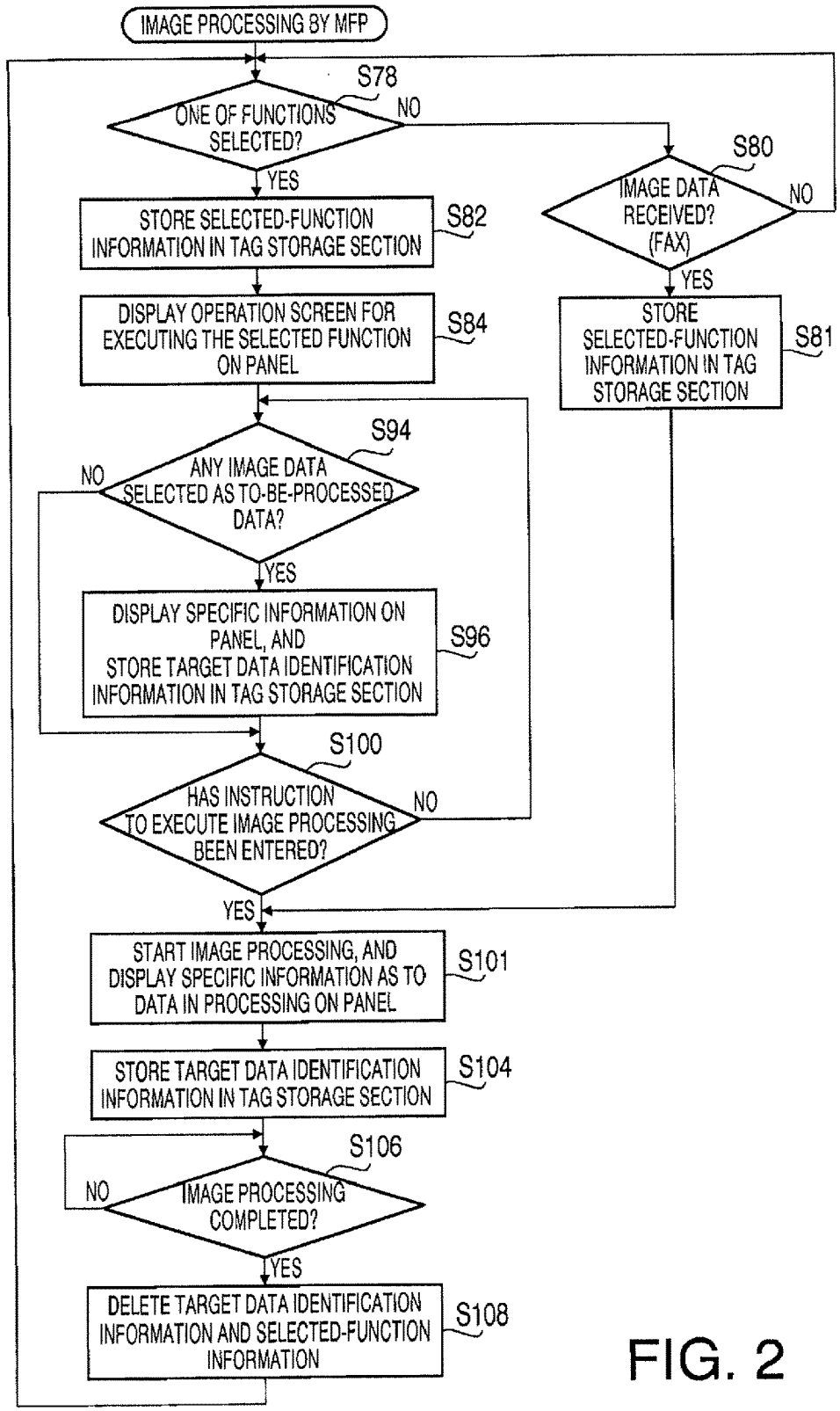
FIG. 2 is a flowchart showing a procedure of image processing to be executed by a multi-function peripheral (MFP) in the embodiment according to one or more aspects of the present invention.
Figure 3:
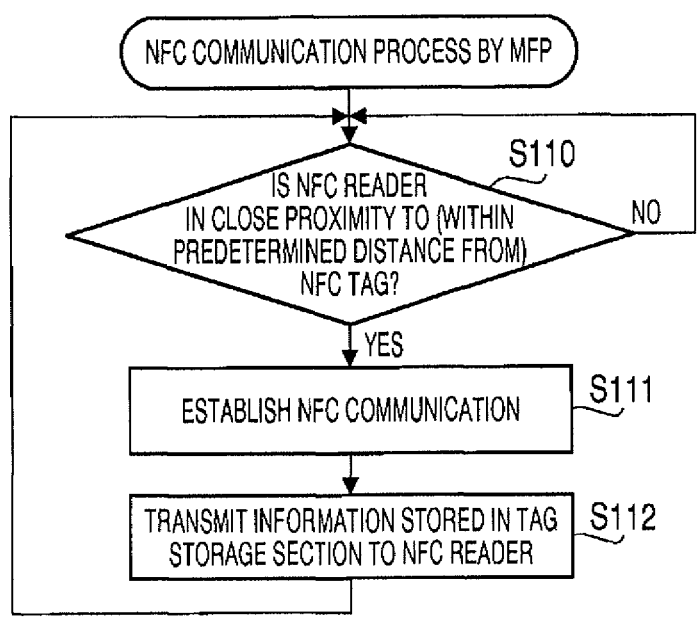
FIG. 3 is a flowchart showing an NFC communication process to be executed by the MFP in the embodiment according to one or more aspects of the present invention.
Figure 4:
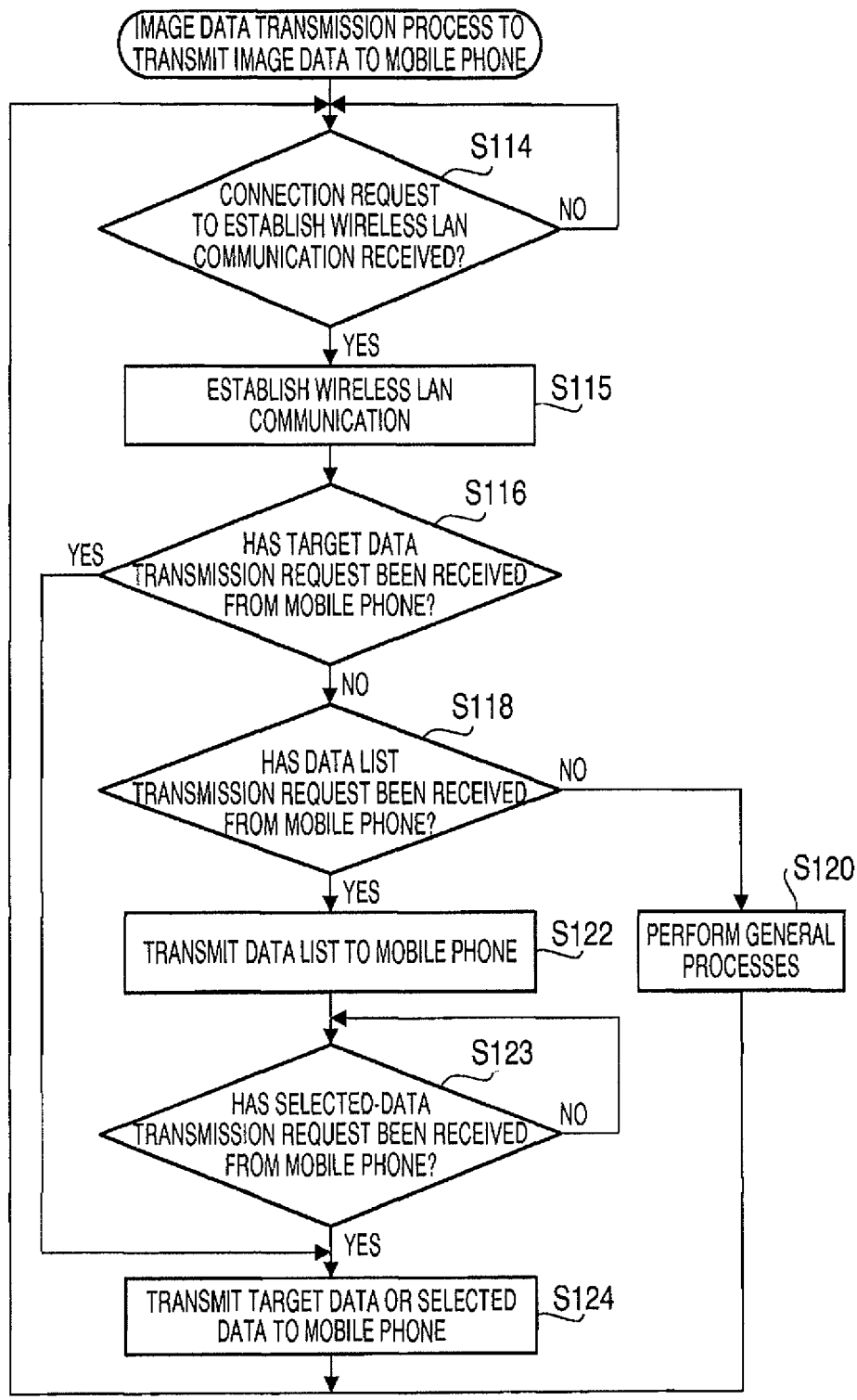
FIG. 4 is a flowchart showing an image data transmission process to be executed by the MFP to transmit image data to a mobile phone in the embodiment according to one or more aspects of the present invention.
Figure 5:
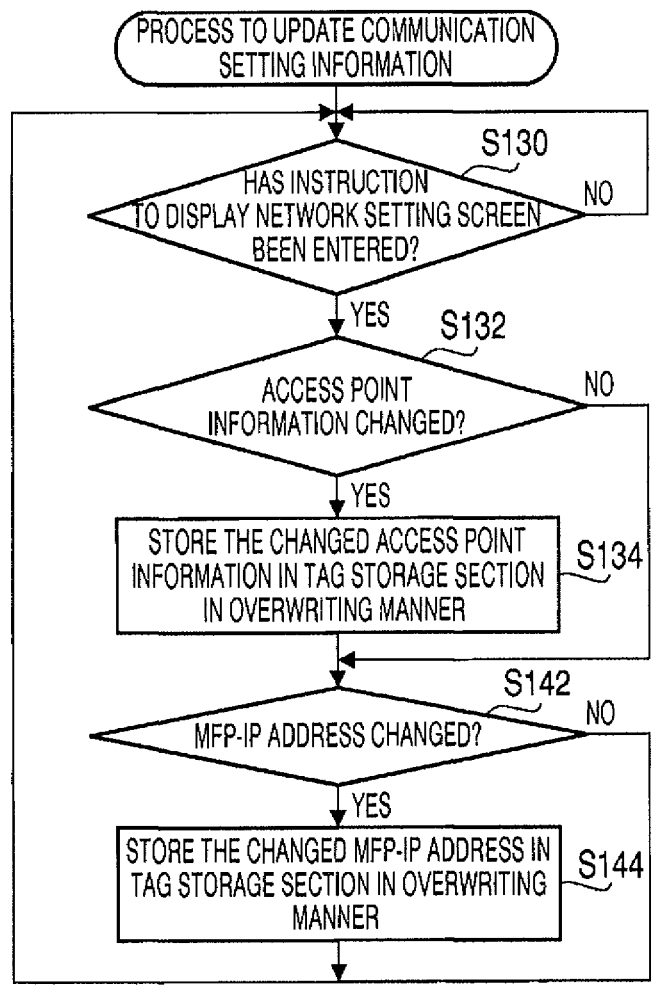
FIG. 5 is a flowchart showing a process to be executed by the MFP to update communication setting information in the embodiment according to one or more aspects of the present invention.
Figure 6:
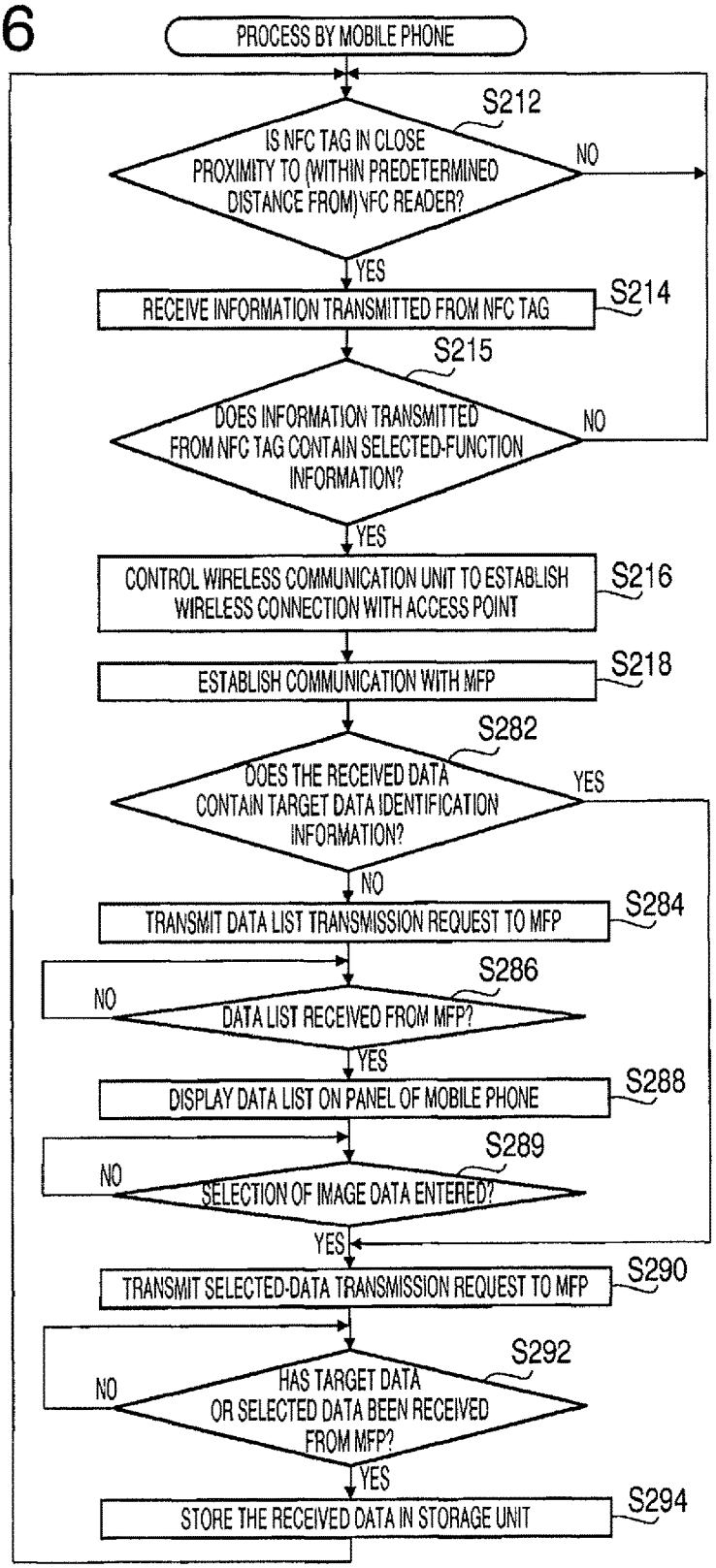
FIG. 6 is a flowchart showing a process to be executed by the mobile phone in the embodiment according to one or more aspects of the present invention.

Operations of the communication system 1 of the embodiment will be described with reference to FIGS. 2 to 6. FIGS. 2 to S are flowcharts showing processes to be executed by the MFP 51. FIG. 2 is a flowchart showing a procedure of image processing. FIG. 3 is a flowchart showing an NFC communication process. FIG. 4 is a flowchart showing an image data transmission process to transmit image data to the mobile phone 10. FIG. 5 is a flowchart showing a process to update the communication setting information. The processes shown in FIGS. 3 to S are to be executed after interrupting the image processing shown in FIG. 2. Namely, each individual process shown in FIGS. 3 to 5 may be launched no matter what step of the process shown in FIG. 2 is in execution. FIG. 6 is a flowchart showing a process to be executed by the mobile phone 10.

<Operations of MFP>

An explanation will be provided as to the image processing to be performed by the MFP 51, with reference to FIG. 2. In S78, the CPU 32 determines whether a function has been selected by the user from the functions of the MFP 51 (e.g., the facsimile transmission function, the incoming facsimile browsing function, the scanning function, and the printing function). For instance, the panel 39 may display thereon icons that represent the functions, respectively, and when the user touches one of the icons, a function corresponding to the touched icon may be selected. When determining that any function has not been selected (S78: No), the CPU 32 goes to S80. In S80, the CPU 32 determines whether the modem 40 has received image data from the telephone line network 100. When determining that the modem 40 has not received image data from the telephone line network 100 (S80: No), the CPU 32 goes back to S78. Meanwhile, when determining that the modem 40 has received image data from the telephone line network 100 (S80: Yes), the CPU 32 goes to S81, in which the CPU 32 stores, in the tag storage section 47 of the NFC tag 46, the selected-function information representing that the incoming facsimile browsing function is selected. Then, the CPU 32 goes to S101 to start image processing using the incoming facsimile browsing function.

Meanwhile, when determining that a function has been selected (S78: Yes), the CPU 32 goes to S82. In S82, the CPU 32 stores the selected-function information corresponding to the selected function in the tag storage section 47 of the NFC tag 46. In S84, the CPU 32 displays, on the panel 39, an operation screen for executing the function selected by the user.

In S94, the CPU 32 determines whether a piece of the image data stored in the storage unit 33 has been selected as data to be processed (to-be-processed data). The to-be-processed data may be selected, for example, when a list of image data names of the image data stored in the storage unit 33 is displayed on the panel 39, and the user touches one of the image data names on the displayed list. When determining that a piece of the image data stored in the storage unit 33 has not been selected (S94: No), the CPU 32 goes to S100, determining that it is a case where image data not stored in the storage unit 33 is used as the to-be-processed data. Examples of the case where image data not stored in the storage unit 33 is used as the to-be-processed data include a case to scan a document sheet and produce image data, and a case to scan a document sheet and transmit the scanned data via facsimile.

Meanwhile, when determining that a piece of the image data stored in the storage unit 33 has been selected as the to-be-processed data (S94: Yes), the CPU 32 goes to S96, determining that it is a case where image data stored in the storage unit 33 is used as the to-be-processed data. As examples of the case where image data stored in the storage unit 33 is used as the to-be-processed data, cited are a case to transmit stored image data via facsimile, and a case to print stored image data.

In S96, the CPU 32 displays, on the panel 39, specific information (e.g., an icon, a file name, a thumbnail (a miniature graphic) of the to-be-processed data) for specifying the to-be-processed data. Here, data of which specific information is displayed on the panel 39 will be defined as a "target data." In other words, the target data is data associated with the specific information displayed on the panel 39. In addition, the CPU 32 stores information for identifying the target data (target data identification information) in the tag storage section 47, so as to inform the mobile phone 10 of which data the specific information displayed on the panel 39 is associated with. As an example of the target data identification information, cited is a file name of the target data.

In S100, the CPU 32 determines whether an instruction to execute image processing has been entered. For example, the instruction to execute image processing may be entered via the button input unit 38. When determining that the instruction to execute image processing has not been entered (S100: No), the CPU 32 goes back to S94. Meanwhile, when determining that the instruction to execute image processing has been entered (S100: Yes), the CPU 32 goes to S101. In S101, the CPU 32 starts the image processing corresponding to the function selected in S78. Further, the CPU 32 displays specific information as to the data in processing on the panel 39. In this case, the data in processing corresponds to the "target data." For instance, when the facsimile transmission function is selected in S78, the CPU 32 starts a process to transmit data using the modem 40, and displays, on the panel 39, specific information as to the data being transmitted. Further, for instance, when the scanning function is selected in S78, the CPU 32 starts a process to scan a document sheet using the scanner 20 and produce image data, and displays, on the panel 39, specific information as to the produced image data. Further, for instance, when there is incoming data from the telephone line network 100 (S80: Yes), the CPU 32 starts a process to receive the data, and displays, on the panel 39, specific information as to the data being received.

In S104, so as to inform the mobile phone 10 of the data in processing (the target data), the CPU 32 stores information for identifying the target data (the target data identification information) in the tag storage section 47.

In S106, the CPU 32 determines whether the image processing has been completed. When determining that the image processing has not been completed (S106: No), the CPU 32 goes back to S106. Meanwhile, when determining that the image processing has been completed (S106: Yes), the CPU 32 goes to S108. In S108, the CPU 32 deletes the target data identification information (see S96 and S104) and the selected-function information (see S82) stored in the tag storage section 47. Then, the CPU 32 goes back to S78.

Referring to FIG. 3, the NFC communication process to be executed on the MFP 51 will be described. In S110, the CPU 32 determines whether the NFC reader 30 of the mobile phone 10 is in close proximity to (within a predetermined distance from) the NFC tag 46. For example, the predetermined distance may be about 10 cm. When determining that the NFC reader 30 is not in close proximity to (within the predetermined distance from) the NFC tag 46 (S110: No), the CPU 32 goes back to S110. Meanwhile, when determining that the NFC reader 30 is in close proximity to (within the predetermined distance from) the NFC tag 46 (S110: Yes), the CPU 32 goes to S111. In S111, the CPU 32 establishes the NFC communication 200 between the NFC tag 46 and the NFC reader 30.

In S112, the CPU 32 transmits the information stored in the tag storage section 47 from the NFC tag 46 to the NFC reader 30 via the NFC communication 200. Then, the CPU 32 goes back to S110. Here, when a time of detecting that the NFC reader 30 is in close proximity to (within the predetermined distance from) the NFC tag 46 (S110: Yes) is within such a period that the specific information is displayed on the panel 39 (a period of S96 to S106), the tag storage section 47 stores the target data identification information, the communication setting information, and the selected-function information. Hence, the target data identification information, the communication setting information, and the selected-function information are transmitted from the NFC tag 46 to the NFC reader 30. Thereby, it is possible to determine, as data to be transmitted to the mobile phone 10, the target data corresponding to the specific information (e.g., an icon) displayed on the panel 39 at a time when the NFC communication 200 is established. Meanwhile, in the case where the time when it is detected that the NFC reader 30 is in close proximity to (within the predetermined distance from) the NFC tag 46 (S110: Yes) is within such a period that the specific information is not displayed on the panel 39 (outside the period of S96 to S106), the tag storage section 47 stores the communication setting information and the selected-function information, but does not store the target data identification information. Hence, the communication setting information and the selected-function information are transmitted from the NFC tag 46 to the NFC reader 30. In this case, data to be transmitted to the mobile phone 10 is not determined.

Referring to FIG. 4, an explanation will be provided as to the image data transmission process to transmit image data to the mobile phone 10. In S114, the CPU 32 determines whether the MFP 51 (the CPU 32) has received a connection request to establish the wireless LAN communication. When determining that the MFP 51 has not received the connection request to establish the wireless LAN communication (S114: No), the CPU 32 goes back to S114. Meanwhile, when determining that the MFP 51 has received the connection request to establish the wireless LAN communication (S114: Yes), the CPU 32 goes to S115. In S115, the CPU 32 controls the wireless communication unit 36 to establish the wireless LAN communication 203 using the communication setting information stored in the tag storage section 47.

In S116, the CPU 32 determines whether the MFP 51 (the CPU 32) has received a target data transmission request from the mobile phone 10. The target data transmission request, which contains the target data identification information, is a request to transmit the target data identified by the target data identification information to the mobile phone 10 via the wireless LAN communications 201 and 203. When determining that the MFP 51 has received the target data transmission request from the mobile phone 10 (S116: Yes), the CPU 32 goes to S124, determining that it is a case where the specific information is displayed on the panel 39 at the time of detecting that the NFC reader 30 is in close proximity to (within the predetermined distance from) the NFC tag 46 (S110: Yes). Meanwhile, when determining that the MFP 51 has not received the target data transmission request from the mobile phone 10 (S116: No), the CPU 32 goes to S118, determining that it is a case where the specific information is not displayed on the panel 39 at the time of detecting that the NFC reader 30 is in close proximity to (within the predetermined distance from) the NFC tag 46 (S110: Yes).

In S118, the CPU 32 determines whether the MFP 51 (the CPU 32) has received a data list transmission request from the mobile phone 10. The data list transmission request is a request to transmit a data list corresponding to the function currently selected on the MFP 51 to the mobile phone 10 via the wireless LAN communication 203. When determining that the MFP 51 has not received the data list transmission request from the mobile phone 10 (S118: No), the CPU 32 goes to S120. In S120, the CPU 32 performs other general processes, and then goes back to S114. Meanwhile, when determining that the MFP 51 has received the data list transmission request from the mobile phone 10 (S118: Yes), the CPU 32 goes to S122.

In S122, the CPU 32 reads out, from the storage unit 33, a data list corresponding to the function currently selected on the MFP 51, and transmits the read data list to the mobile phone 10. In S123, the CPU 32 determines whether the MFP 51 (the CPU 32) has received a selected-data transmission request containing selected-data identification information from the mobile phone 10. The selected-data identification information is information for identifying image data (hereinafter referred to as selected data) selected on the mobile phone 10. When determining that the MFP 51 has not received the selected-data transmission request containing the selected-data identification information from the mobile phone 10 (S123: No), the CPU 32 goes back to S123. Meanwhile, when determining that the MFP 51 has received the selected-data transmission request containing the selected-data identification information from the mobile phone 10 (S123: Yes), the CPU 32 goes to S124.

In S124, the CPU 32 transmits, to the mobile phone 10 via the wireless LAN communications 201 and 203, the target data identified by the target data identification information contained in the target data transmission request, or the selected data identified by the selected-data identification information contained in the selected-data transmission request. Then, the CPU 32 goes back to S114.

Referring to FIG. 5, an explanation will be provided as to the process to update the communication setting information stored in the tag storage section 47. In S130, the CPU 32 determines whether an instruction to display a network setting screen has been entered. The network setting screen is a screen for setting various setting values contained in the communication setting information stored in the tag storage section 47. For example, the instruction to display the network setting screen may be entered via the button input unit 38.

In S132, the CPU 32 determines whether the access point information, which is one of the setting values contained in the communication setting information, has been changed. When determining that the access point information has not been changed (S132: No), the CPU 32 goes to S142. Meanwhile, when determining that the access point information has been changed (S132: Yes), the CPU 32 goes to S134. In S134, the CPU 32 stores the changed access point information in the tag storage section 47 in an overwriting manner.

In S142, the CPU 32 determines whether the MFP-IP address, which is one of the setting values contained in the communication setting information, has been changed. When determining that the MFP-IP address has not been changed (S142: No), the CPU 32 goes back to S130. Meanwhile, when determining that the MFP-IP address has been changed (S142: Yes), the CPU 32 goes to S144. In S144, the CPU 32 stores the changed MFP-IP address in the tag storage section 47 in an overwriting manner. Then, the CPU 32 goes back to S130.

<Operations of Mobile Phone>

Referring to FIG. 6, a process to be executed by the mobile phone 10 will be described. The process shown in the flowchart of FIG. 6 is launched in response to execution of the MFP control application 28. In S212, the CPU 11 determines whether the NFC tag 46 of the MFP 51 is in close proximity to (within the predetermined distance from) the NFC reader 30. When determining that the NFC tag 46 is not in close proximity to (within the predetermined distance from) the NFC reader 30 (S212: No), the CPU 11 goes back to S212. Meanwhile, when determining that the NFC tag 46 is in close proximity to (within the predetermined distance from) the NFC reader 30 (S212: Yes), the CPU 11 goes to S214.

In S214, the CPU 11 controls the NFC reader 30 to receive information transmitted from the NFC tag 46 via the NFC communication 200. When the NFC reader 30 is brought into close proximity to (within the predetermined distance from) the NFC tag 46 within the period that the specific information is displayed on the panel 39 of the MFP 51, the information transmitted from the NFC tag 46 contains the target data identification information, the communication setting information, and the selected-function information. Meanwhile, when the NFC reader 30 is brought into close proximity to (within the predetermined distance from) the NFC tag 46 within the period that the specific information is not displayed on the panel 39 of the MFP 51, the information transmitted from the NFC tag 46 contains the communication setting information and the selected-function information, but does not contain the target data identification information.

In S215, the CPU 11 determines whether the information transmitted from the NFC tag 46 contains the selected-function information. When determining that the information transmitted from the NFC tag 46 does not contain the selected-function information (S215: No), the CPU 11 goes back to S212, determining that it is a case where when the user has not selected any of the plurality of functions (S78: No), or when the MFP 51 has not received any facsimile data (S80: No), the NFC tag 46 is brought into close proximity to (within the predetermined distance from) the NFC reader 30, and the NFC communication 200 is performed. Meanwhile, when determining that the information transmitted from the NFC tag 46 contains the selected-function information (S215: Yes), the CPU 11 goes to S216.

In S216, the CPU 11 controls the wireless communication unit 15 to establish a wireless connection with the access point 62. In S218, the CPU 11 establishes communication with the MFP 51 via the wireless LAN communications 201 and 203. In S282, the CPU 11 determines whether data received from the MFP 51 via the NFC communication 200 contains the target data identification information. When determining that the data received from the MFP 51 via the NFC communication 200 contains the target data identification information (S282: Yes), the CPU 11 goes to S290, determining that it is a case where the NFC reader 30 is brought into close proximity to (within the predetermined distance from) the NFC tag 46 within the period that the specific information is displayed on the panel 39 of the MFP 51, and the data to be transmitted to the mobile phone 10 is determined. Meanwhile, when determining that the data received from the MFP 51 via the NFC communication 200 does not contain the target data identification information (S282: No), the CPU 11 goes to S284, determining that it is a case where the NFC reader 30 is brought into close proximity to (within the predetermined distance from) the NFC tag 46 within the period that the specific information is not displayed on the panel 39 of the MFP 51, and the data to be transmitted to the mobile phone 10 is not determined.

In S284, the CPU 11 transmits the data list transmission request to the MFP 51 via the wireless LAN communications 201 and 203. At this time, requested is the data list corresponding to the function specified by the selected-function information received in S214 (the function currently selected on the MFP 51). In S286, the CPU 11 determines whether the mobile phone 10 (the CPU 11) has received the data list from the MFP 51 via the wireless LAN communications 201 and 203. When determining that the mobile phone 10 has not received the data list from the MFP 51 via the wireless LAN communications 201 and 203 (S286: No), the CPU 11 goes back to S286. Meanwhile, when determining that the mobile phone 10 has received the data list from the MFP 51 via the wireless LAN communications 201 and 203 (S286: Yes), the CPU 11 goes to S288.

In S288, the CPU 11 displays the data list on the panel 18 of the mobile phone 10. Thereby, it is possible to provide the user with a list of data processable using the function currently selected on the MFP 51. Then, the CPU 11 accepts entry for selecting image data from the data list. For example, the entry for selecting image data from the data list may be accepted via the button input unit 17. In S289, the CPU 11 determines whether a selection of the image data has been entered. When determining that a selection of the image data has not been entered (S289: No), the CPU 11 goes back to S289. Meanwhile, when determining that a selection of the image data (the selected data) has been entered (S289: Yes), the CPU 11 goes to S290. In S290, the CPU 11 transmits, to the MFP 51 via the wireless LAN communications 201 and 203, the selected-data transmission request containing the selected-data identification information for identifying the image data selected in S289. It is noted that, when determining in S282 that the data received from the MFP 51 via the NFC communication 200 contains the target data identification information (S282: Yes), in S290, the CPU 11 transmits the target data transmission request containing the target data identification information to the MFP 51 via the wireless LAN communications 201 and 203.

In S292, the CPU 11 determines whether the mobile phone 10 (the CPU 11) has received the target data or the selected data from the MFP 51 via the wireless LAN communications 201 and 203. When determining that the mobile phone 10 has not received the target data or the selected data from the MFP 51 via the wireless LAN communications 201 and 203 (S292: No), the CPU 11 goes back to S292. Meanwhile, when determining that the mobile phone 10 has received the target data or the selected data from the MFP 51 via the wireless LAN communications 201 and 203 (S292: Yes), the CPU 11 goes to S294. In S294, the CPU 11 stores the received data in the storage unit 12. Afterward, the CPU 11 terminates the process shown by the flowchart of FIG. 6.

<Advantageous Effects>

An explanation will be provided as to advantageous effects of the communication system 1 configured as above in the embodiment. By bringing the mobile phone 10 having the NFC reader 30 into close proximity to (e.g., within a predetermined distance of 10 cm from) the NFC tag 46 (S110: Yes, and S212: Yes) within the period (the period of S96 to S106) that the specific information (e.g., an icon) of the target data is displayed on the panel 39 of the MFP 51, it is possible to determine the target data corresponding to the specific information displayed on the panel 39, as data to be transmitted to the mobile phone 10. Thereby, it is possible to omit various input operations through the button input units 17 and 38 to select the data to be transmitted to the mobile phone 10. Thus, it is possible to operate the communication system 1 (the mobile phone 10 and the MFP 51) in an intuitive manner and enhance user-friendliness of the communication system 1.

The communicable distance of the NFC communication 200 is shorter than that of the wireless LAN communication 203. Thereby, even when there are a plurality of MFPs, it is possible to select an intended one of the plurality of MFPs as a communication party by bringing the mobile phone 10 into close proximity to (within the predetermined distance from) the intended MFP. Thus, by using the NFC communication 200, an intuitive operation of holding the mobile phone 10 over the intended MFP makes it possible to specify the intended MFP.

For instance, when the scanning function is selected as a function to be executed on the MFP 51 (S78), during a period to scan a document sheet using the scanner 20, the specific information (e.g., an icon) for specifying the data in processing (scanning) is displayed on the panel 39 of the MFP 51 (S101). Further, for instance, when the incoming facsimile browsing function is selected as a function to be executed on the MFP 51 (S78), during a period to receive data using the modem 40, the specific information (e.g., an icon) for specifying the data in processing (data receiving) is displayed on the panel 39 of the MFP 51 (S101). Further, for instance, when the printing function is selected as a function to be executed on the MFP 51 (S78), during a period to perform printing using the printer 19, the specific information (e.g., an icon) for specifying the data in processing (printing) is displayed on the panel 39 of the MFP 51 (S101). Then, when the user wishes to receive the image data in processing by the mobile phone 10, the user has only to hold the mobile phone 10 over the MFP 51 during the period that the specific information is displayed on the panel 39. Thereby, it is possible to receive, by the mobile phone 10, the target data (the image data in processing) corresponding to the specific information displayed on the panel 39. Thus, through such an intuitive operation, it is possible to receive user's desired data.

When the MFP 51 (the CPU 32) does not receive the target data transmission request from the mobile phone 10 (S116: No), it is a case where the specific information is not displayed on the panel 39 at the time when the MFP 51 detects that the NFC reader 30 is in close proximity to (within the predetermined distance from) the NFC tag 46 (S110: Yes). Namely, it is a case where the data to be transmitted to the mobile phone 10 is not determined. Therefore, by transmitting the data list to the mobile phone 10 (S122), the MFP 51 is allowed to cause the mobile phone 10 to perform the process to select the data to be transmitted to the mobile phone 10 (S288). Then, in response to receipt of the selected-data transmission request containing the selected-data identification information from the mobile phone 10 (S123: Yes), the MFP 51 is allowed to transmit the selected data identified by the selected-data identification information to the mobile phone 10 via the wireless LAN communications 201 and 203 (S124). Thereby, when the mobile phone 10 is held over (brought into close proximity to) the MFP 51 during the period that the specific information is not displayed on the panel 39, it is possible to select the data to be communicated, on the mobile phone 10.

The communication speed of the wireless LAN communications 201 and 203 is faster than that of the NFC communication 200. Further, the image data is communicated via the wireless LAN communications 201 and 203 (S124). Thereby, it is possible to achieve faster communication of the image data than when using the NFC communication 200. Thus, it is possible to shorten a time taken for the communication of the image data.

Hereinabove, the embodiment according to aspects of the present invention has been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only an exemplary embodiment of the present invention and but a few examples of their versatility are shown and described in the present disclosure. It is to be understood that the present invention is capable of use in various other combinations and environments and is capable of changes or modifications within the scope of the inventive concept as expressed herein. For example, the following modifications are possible. It is noted that, in the following modifications, explanations of the same configurations as exemplified in the aforementioned embodiment will be omitted.

[Modifications]

In the aforementioned embodiment, the mobile phone 10 is configured to perform the wireless LAN communication 201 with the access point 62. However, the mobile phone 10 may be configured to perform wired communication with the access point 62, for instance, via a LAN cable. In this case, the mobile phone 10 may be configured to establish communication with the MFP 51 even without receiving any information on the SSID of the access point 62. Hence, the communication setting information (see S112) to be transmitted from the MFP 51 to the mobile phone 10 via the NFC communication 200 may contain at least the IP address of the MFP 51.

In the aforementioned embodiment, in S96 and S101, the specific information is displayed on the panel 39 of the MFP 51. However, the method for informing the user of the specific information is not limited to the method to display the specific information on the panel 39. For example, the method for informing the user of the specific information may be a method to inform the user, using the indicating lamp 45, of the specific information that the image processing is in execution (S106: No).

In the aforementioned embodiment, the receipt of the target data transmission request (see S116), the receipt of the data list transmission request (see S118), and the transmission of the data list (see S122) are carried out via the wireless LAN communication 203. However, the receipt of the target data transmission request (see S116), the receipt of the data list transmission request (see S118), and the transmission of the data list (see S122) may be implemented via the NFC communication 200.

In the aforementioned embodiment, the explanation has been provided as to the case where in S82, the MFP 51 (the CPU 32) stores the selected-function information corresponding to the selected function of the MFP 51 in the tag storage section 47 of the NFC tag 46. However, the step S82 may be omitted. In this case, since the selected-function information is not transmitted to the mobile phone 10, the mobile phone 10 is not allowed to recognize the function currently selected on the MFP 51. Therefore, in S284, the mobile phone 10 (the CPU 11) may display on the panel 18 thereof a screen for selecting a function of the MFP 51 and accept entry to select a function of the MFP 51. Further, the mobile phone 10 may be configured to, in response to the acceptance of the entry to select a function of the MFP 51, issue to the MFP 51 a request for the data list corresponding to the selected function.

In S215, when the information transmitted from the NFC tag 46 does not contain the selected-function information (S215: No), the mobile phone 10 (the CPU 11) may establish the wireless connection with the access point 62 (S216) and establish the communication with the MFP 51 (S218). Then, in S218, the mobile phone 10 may issue a request for data lists regarding all the functions of the MFP 51. Further, in S288, the mobile phone 10 may display on the panel 18 thereof a screen for selecting a function of the MFP 51 and accept entry to select a function of the MFP 51. Moreover, the mobile phone 10 may display on the panel 18 the data list corresponding to the selected function.

In the aforementioned embodiment, the communication for achieving the facsimile transmission function and the incoming facsimile browsing function is performed via the telephone line network 100. However, the communication for achieving the facsimile transmission function and the incoming facsimile browsing function may be performed via an Internet (not shown).

The mobile phone 10 and the MFP 51 may be configured to perform wireless LAN communication in an ad-hoc mode without having to involving the access point 62.

In the aforementioned embodiment, the data of which the specific information is displayed on the panel 39 is defined as the "target data." However, the specific information displayed on the panel 39 may include specific information that is not currently displayed on the panel 39 but is displayable on the panel 39 through a scrolling operation.

In S106, the determination that "the image processing has been completed" may not necessarily be made in response to an event that image processing such as a scanning process or a facsimile transmitting-receiving process has been completed, but may be made in response to acceptance of a user's input (e.g., pressing of an OK button) for informing that the user has confirmed that the image processing has been completed, after the completion of the image processing. In this case, the state where the specific information is displayed on the panel 30 may be maintained until acceptance of the user's input for informing that the user has confirmed that the image processing has been completed. Alternatively, the determination that "the image processing has been completed" may be made after a lapse of a predetermined period of time (e.g., five minutes) since the completion of the image processing. In this case, the state where the specific information is displayed on the panel 30 may be maintained until the predetermined period of time elapses since the completion of the image processing.

Further, instead of the mobile phone 10, a device having a communication function (e.g., a notebook computer) may be employed. In this case, the MFP control application 28 may be included in various kinds of driver software installed in the notebook computer.

There may be one or more MFPs each having an NFC tag, in addition to the MFP 51 exemplified in the aforementioned embodiment.

What is claimed is:

1. An image processing apparatus comprising:
   a plurality of image processing devices configured to execute a plurality of kinds of image processing;
   a first communication device configured to communicate with an information processing terminal device via first communication within a first communicable distance between the first communication device and the information processing terminal device;

a second communication device configured to communicate with the information processing terminal device via second communication within a second communicable distance, longer than the first communicable distance, between the second communication device and the information processing terminal device;

an information storage; and a controller coupled with the first communication device, the second communication device and the information storage via an input-output port, the controller being configured to:

select a specific kind of image processing from among the plurality of kinds of image processing;

control a specified one of the image processing devices to execute the specific kind of image processing;

store identification information into the information storage, the identification information identifying the specific kind of image processing in execution by the specified one of the image processing devices;

control the first communication device to establish the first communication with the information processing terminal device that is within the first communicable distance from the first communication device; and in response to the first communication being established between the first communication device and the information processing terminal device while the specific kind of image processing for target data is in execution, perform:

causing the information processing terminal device to read out the identification information identifying the specific kind of image processing in execution; and after the identification information is read out by the information processing terminal device, performing:

establishing the second communication with the information processing terminal device via the second communication device; and controlling the second communication device to transmit the target data, on which the specific kind of image processing, which is identified by the information processing terminal device based on the read out identification information, is performed, to the information processing terminal device.

2. The image processing apparatus according to claim 1, wherein the controller is further configured to:

control the first communication device to establish the first communication to wirelessly communicate with the information processing terminal device at a first communication speed, in response to the first communication device coming within the first communicable distance from the information processing terminal device; and control the second communication device to establish, using communication setting information, the second communication to communicate with the information processing terminal device at a second communication speed higher than the first communication speed of the first communication.

3. The image processing apparatus according to claim 2, wherein the controller is further configured to control the first communication device to transmit the communication setting information to the information processing terminal device via the first communication.

4. The image processing apparatus according to claim 1, wherein the controller is further configured to:

control the first communication device to transmit target data identification information for identifying the target data to the information processing terminal device via the first communication; and control the second communication device to transmit the target data, identified by the target data identification information, to the information processing terminal device via the second communication in response to receipt of a request containing the target data identification information after establishment of the second communication.

5. The image processing apparatus according to claim 1, further comprising a storage device, wherein the controller is further configured to:

control one of the first communication device and the second communication device to transmit data identification information for identifying data stored in the storage device, to the information processing terminal device via a corresponding one of the first communication and the second communication, when the image processing apparatus is not executing the image processing of the target data at a time of beginning to establish the corresponding one of the first communication and the second communication; and control the second communication device to, in response to receiving selected-data identification information for identifying data selected on the information processing terminal device from the information processing terminal device, transmit the selected data identified by the selected-data identification information to the information processing terminal device via the second communication.

6. The image processing apparatus according to claim 1, wherein the plurality of kinds of image processing include an image scanning operation of scanning an image on a document sheet and producing the target data based on the scanned image;

wherein the controller is further configured to:

in response to selecting the image scanning operation as the specific kind of image processing, store the identification information into the information storage; and in response to the first communication being established between the first communication device and the information processing terminal device during execution of the image scanning operation, perform:

causing the information processing terminal device to read out the identification information store in the information storage via the first communication; and after the identification information is read out by the information processing terminal device, controlling the second communication device to transmit the target data produced by the image scanning operation to the information processing terminal device.

7. The image processing apparatus according to claim 6, further comprising a scanning device configured to perform the image scanning operation.

8. The image processing apparatus according to claim 1, wherein the plurality of kinds of image processing include an image transmitting operation of transmitting image data as the target data via third communication;

wherein the controller is further configured to, in response to selecting the image transmitting operation as the specific kind of image processing, store the identification information in to the information storage.

9. The image processing apparatus according to claim 8, further comprising a third communication device configured to perform the image transmitting operation of transmitting the target data via the third communication.

10. The image processing apparatus according to claim 1, wherein the plurality of kinds of image processing include an image printing operation of printing an image based on the target data;
wherein the controller is further configured to, in response to selecting the image printing operation as the specific kind of image processing, store the identification information in the information storage.

11. The image processing apparatus according to claim 10, further comprising:
a storage device configured to store the target data; and
a printing device configured to perform the image printing operation based on the target data stored in the storage device.

12. The image processing apparatus according to claim 1, wherein the controller is further configured to accept a user operation and determine which kind of image processing is selected based on the accepted user operation.

13. The image processing apparatus according to claim 1, wherein the plurality of kinds of image processing include a facsimile outputting process to receive image data via a telephone line and output the received image data, and
wherein the controller is further configured to perform:
in response to receiving the image data via the telephone line,
selecting the facsimile outputting process as the specific kind of image processing; and
storing the identification into the information storage.

14. An image processing apparatus comprising:
a plurality of image processing devices configured to execute a plurality of kinds of image processing;
a first communication device configured to communicate with an information processing terminal device via the first communication within a first communicable distance between the first communication device and the information processing terminal device;
a second communication device configured to communicate with the information processing terminal device via second communication within a second communicable distance, longer than the first communicable distance, between the second communication device and the information processing terminal device; and
a controller coupled with the first communication device and the second communication device via an input-output port,
wherein the plurality of kinds of image processing include an image scanning operation of scanning an image on a document sheet and producing scanned data based on the scanned image, and
wherein the controller being configured to:
select a specific kind of image processing from among the plurality of kinds of image processing;
control the first communication device to establish the first communication with the information processing terminal device that is within the first communicable distance from the first communication device; and
in response to selecting the image scanning operation as the specific kind of image processing, execute the image scanning operation; and
in response to the first communication being established between the first communication device and the information processing terminal device while the image scanning operation is in execution, perform:
controlling the information processing terminal device to read out identification information, the identification information identifying that the image scanning operation in execution; and
after the identification information is read out by the information processing terminal device, performing:
establishing the second communication with the information processing terminal device via the second communication device; and
controlling the second communication device to output the scanned data, which is produced by the image scanning operation identified by the information processing terminal device based on the output identification information, to the information processing terminal device.

15. The image processing apparatus according to claim 14,
wherein the plurality of kinds of image processing include an image printing operation of printing an image based on image data, and
wherein the controller is further configured to:
in response to selecting the image printing operation as the specific kind of image processing, execute the image printing operation; and
in response to the first communication being established between the first communication device and the information processing terminal device while the image printing operation is in execution, perform:
controlling the information processing terminal device to read out identification information, the identification information identifying that the image printing operation in execution; and
after the identification information is read out by the information processing terminal device, performing:
establishing the second communication with the information processing terminal device via the second communication device; and
controlling the second communication device to output the image data, which is printed by the image printing operation identified by the information processing terminal device based on the output identification information, to the information processing terminal device.

* * * * *